INVENTORS.
LEON S. YAGGY,
NOBUO J. KODA,
BY
W H McAllister Jr
ATTORNEY.

United States Patent Office 3,493,803
Patented Feb. 3, 1970

3,493,803
DIELECTRIC COATED MESH STORAGE TARGET HAVING CONDUCTIVE REGIONS CO-TERMINOUS WITH THE MESH FOR USE IN SCAN CONVERTER TUBES
Nobuo J. Koda, Vista, and Leon S. Yaggy, North Carlsbad, Calif., assignors to Hughes Aircraft Company, Culver City, Calif., a corporation of Delaware
Continuation-in-part of application Ser. No. 450,332, Apr. 23, 1965. This application July 18, 1966, Ser. No. 567,348
The portion of the term of the patent subsequent to Sept. 5, 1984, has been disclaimed
Int. Cl. H01g 31/48
U.S. Cl. 313—68       10 Claims

ABSTRACT OF THE DISCLOSURE

A storage target for scan converter tubes having a metallic mesh with a continuous dielectric layer on one surface through which dielectric layer gold is diffused at portions which overlay and contact the underlying mesh whereby charge build-up is prevented at the gold-diffused regions of the dielectric layer.

---

Figure 1:
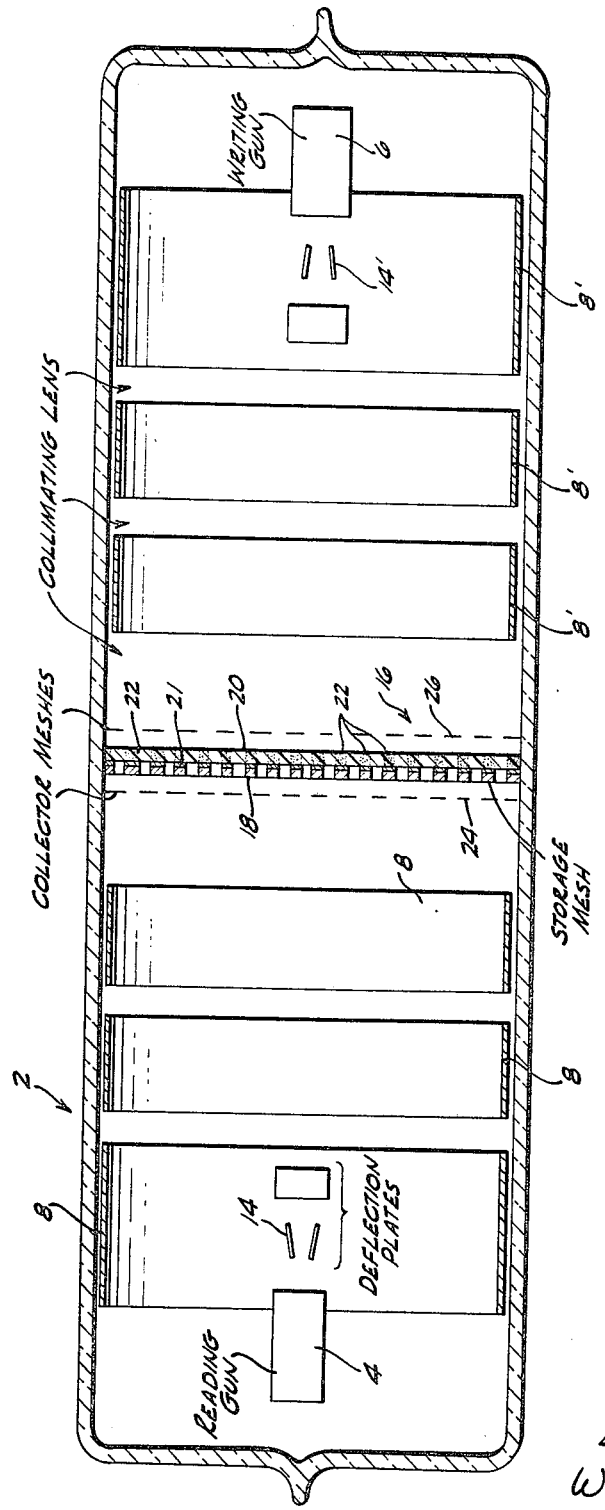

This is a continuation-in-part of application Ser. No. 450,332 filed Apr. 23, 1965, now abandoned, by the same inventors and assigned to the instant assignee.

This invention relates to cathode ray tubes, particularly of the type utilizing a storage target whereby electrical signals of one pattern may be produced from electrical signals of a different pattern. More particularly, the present invention relates to cathode ray tubes of the "scan-conversion" type whereby electrical signals representing a scanning pattern of one frequency can be converted into electrical signals representing a scanning pattern of a different frequency.

Scan-conversion cathode ray tubes are useful, for example, where it is desired to present a radar-type display at television scan frequencies. One way of doing this, of course, is to derive the necessary television video signals by viewing the radar display directly with a television camera or pick-up tube. However, the loss of detail and display resolution is so severe that this method is not very useful. Ideally, one would supply the television transmitter with the electrical signals representing the radar display. However, the radar signals are derived by a different and an extensively slow scanning frequency in comparison with television scanning frequencies. For example, the well-known P.P.I. radar scan may have a cycle time of about 10 seconds in comparison with television-type scans which may have a cycle time of 1/30 of a second.

It will therefore be appreciated that a suitable electronic or electrical scan-conversion system must employ some means for storing the slower scan signals while deriving the faster scan signals corresponding thereto. Cathode ray tubes capable of performing such a function have been provided heretofore but have been characterized by some rather undesirable features. In general, scan-conversion tubes of the prior art have utilized a storage target comprising a perforated conducing screen having on one side a coating of secondary emissive dielectric material. This target is disposed between a pair of opposed electron guns, one of which, called the "writing" gun, scans the coated side of the target at one scan frequency to thereby and thereon establish a stored charge pattern by secondary emission representative of the input signals; the other gun, called the "reading" gun, scans the uncoated side of the target at a different scan frequency and, in effect, penetrates the storage target and is modulated in accordance with the stored charge pattern. The varying electron current of the "reading" beam thus obtained may be utilized to provide an electrical output signal corresponding to the charge pattern and hence of the original input signals. Such a tube is shown and described in U.S. Patent No. 2,547,638 to B. C. Gardner. Another type of cathode ray tube for achieving the same function but employing only one electron gun and an imperforate plate having a secondary electron emissive coating thereon is the so-called "barrier grid storage tube." Such a tube is shown and described in U.S. Patent No. 2,454,410 to R. L. Snyder, Jr.

Some of the disadvantages of the prior art "scan-conversion" tubes employing a dielectric coated mesh electrode are cross-talk between the input and output functions and other undesirable effects due to the build-up of electrical charges at portions of the dielectric opposite the mesh. In addition, storage charges may be built up on the storage dielectric by the "writing" beam which cannot always be "read" and/or "erased" by the "reading" beam because the dielectric region which is charged is not "visible" to the "reading" beam because of the mesh electrode structure.

It is therefore an object of the present invention to provide an improved storage target for cathode ray tubes.

Another object of the invention is to provide an improved storage target for cathode ray tubes of the signal or scan-conversion type.

These and other objects and advantages of the invention are realized by providing a target having a unique dielectric storage target in a cathode ray tube. In one embodiment, this storage target is provided intermediate a pair of opposed electron guns. The storage target comprises a metallic mesh having on one surface thereof a continuous layer or coating of dielectric material through which a metal, such as gold, is diffused at those portions of the dielectric layer which overlay and contact the mesh wires. Thus, charges cannot be built up by the "writing" beam on the dielectric layer at the gold-diffused regions because these regions are, in effect, shorted electrically to the mesh electrode and are at the same potential as the mesh electrode. This is especially important in double-end tubes where the storage target is disposed between a pair of electron guns since the "writing" beam now can only "write" and store charges on portions of the storage dielectric layer whose reverse side is "visible" to the "reading" beam.

Figure 2:
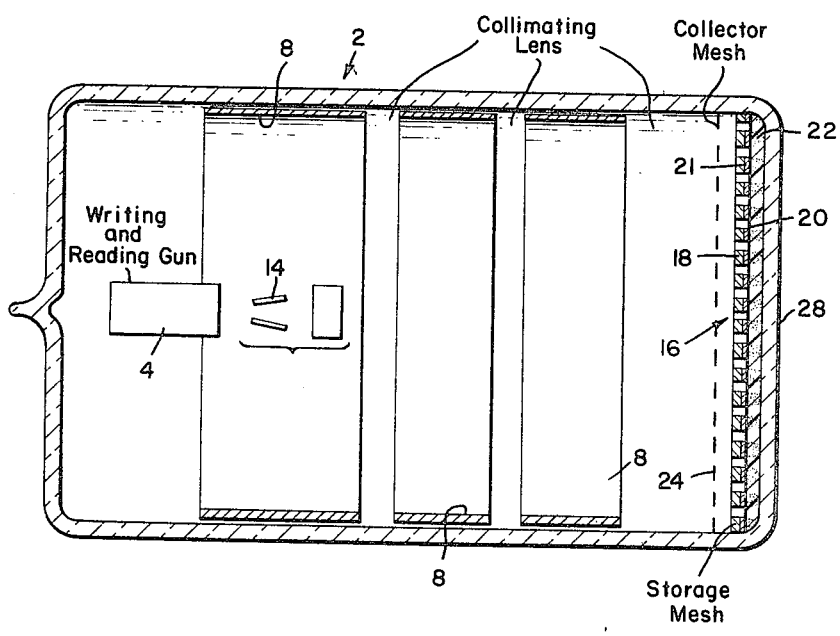

The invention will be described in greater detail by reference to the drawings in which:

FIGURE 1 is an elevational view, partly in section, of a double-ended or two-gun scan-converter tube according to the invention; and FIGURE 2 is an elevational view, partly in section, of a single-ended or single gun scan-converter tube according to another embodiment of the invention.

Referring now to the drawings, a cathode ray tube is shown comprising a tubular envelope 2 of electrically insulating material such as glass, for example, in the opposite ends of which are disposed a pair of conventional electron guns 4 and 6 which may be termed the "reading" and "writing" guns, respectively. Also shown are a pair of collimating lens systems 8 and 8', one for collimating the beam formed by each of the guns 4 and 6 as well as deflection means or plates 14 and 14' for each of the guns 4 and 6. As these components and their operation and functions are well understood in the art of electron tube optics, further detailed description thereof is not deemed necessary herein. It should be understood that the deflection means can be either electromagnetic or electrostatic, as is well known, and some advantage such as system compatibility may be realized by utilizing electromagnetic deflecting means for one gun and electrostatic deflection means for the other gun.

About intermediate the length of the tubular envelope 2 a target structure 16 is disposed. The target structure 16 comprises a mesh electrode and support member 18 which may be of electroformed nickel, for example, having about 250–300 meshes per square inch. On one side of the mesh electrode member 18 facing the "writing" gun 6 is a thin continuous layer 20 of dielectric material having a secondary electron emission ratio in response to electron beam bombardment greater than unity for beam velocities above a predetermined velocity (hereinafter called the secondary emission cross-over point) and less than unity for beam velocities below such predetermined velocity. The dielectric layer 20 may be about 0.2 micron thick and of zinc sulfide material. In order to make certain that the potential of the dielectric surfaces of the layer 20, which are directly over the wires of the mesh electrode member 18, may be the same as the potential on these wires, a layer 21 of gold is formed by evaporation on the mesh electrode member 18 and then the continuous dielectric layer 20 is deposited over the gold-coated surface of the mesh electrode member 18. Thereafter, by a suitable baking operation, the gold is caused to diffuse through the dielectric layer 20 to form the gold-diffused regions 22 therein, thus lowering the dielectric resistance through the dielectric layer 20 over the mesh wires. Such a diffusion may be accomplished by utilizing a gold film about 100 A. thick on the mesh electrode member 18 and then heating the structure for about 0.5 to 1.0 hour at a temperature of about 300° C.

Also disposed in the envelope 2 is a pair of collector electrodes or grids 24 and 26, one being disposed on either side of the target structure 16 for the purpose of collecting secondary electrons emitted therefrom. Such collector electrodes may comprise conductive screens having a transparency to electrons of 80% or better.

In operation, and using the cathode of the "reading" gun as a "zero" voltage reference point, the mesh electrode member 18 is initially operated at a potential of about 25 volts positive with respect to the "reading" gun cathode. The "reading" beam is then caused to scan the portions of the dielectric layer 20 exposed thereto through the meshes of the mesh electrode member 18 but at a velocity below the secondary emission cross-over point so that these portions of the dielectric layer are charged negatively to the potential of the "reading" gun cathode. At this point the reading beam can no longer land on the dielectric layer 20. Thereafter the mesh electrode member 18 is lowered to about 5 volts and the dielectric layer is lowered with it to about −20 volts because of the capacitance between the layer and the mesh electrode. Under these conditions the reading beam cannot even land on the mesh electrode member 18. In order to "write" or store information in the form of charges on the dielectric layer 20, the "writing" gun, whose cathode is operated at a negative potential with respect to the dielectric potential, is caused to generate and scan the dielectric layer with an electron beam at a velocity above the secondary-emission cross-over point so as to cause the potential of the dielectric layer to increase to a positive potential by amounts depending on the "writing" beam intensity and duration. It will be understood that the "writing" beam is intensity-modulated in accordance with signals representing information and caused to scan the target assembly 16 at a predetermined frequency. The dielectric surface potential on the "reading" gun side of the target assembly will also increase to a positive potential because of the capacitance of the thin dielectric layer 20. Hence, when the "reading" side of the dielectric layer 20 is scanned by the "reading" beam at a second scanning frequency, more writing beam electrons can land on the mesh electrode member 18 and fewer are returned to the collector mesh 24 in accordance with the areas of the dielectric layer charged by the writing beam. The output signals thus generated are taken from the reading gun collector mesh 24.

It will be appreciated that the "read-out" just described is nondestructive which means that it is possible to read-out stored information for many minutes. It is also possible to selectively erase stored information at relatively high scanning speeds comparable to television scan rates from either the "read" side or the "write" side of the storage target. This is an additional advantage of the scan converter tube of the invention in comparison with prior art tubes of this type which have the capability of selectively erasing from only the "read" side. This advantage of the present invention is due principally to the fact that the target structure thereof presents essentially similar mesh conductor lines surrounding each dielectric island to both the reading and writing electron beams. This target construction in combination with the low capacitance characteristic of the target makes possible very high resolution selective erasure at high speeds from either side of the target. Cross-talk between the input and output sides of the target is also avoided by the present invention since the writing beam cannot penetrate to the "read" side of the target.

It is also feasible to operate the scan converter tube of the invention so as to achieve a relatively long (up to several minutes) controlled fade of stored information during the reading operation. Controlled fading requires some way of slowly discharging a non-destructive read-out target. With the target of the present invention this may be achieved by time-sharing the operation of one of the electron guns for slow erasure, for example. Alternatively, slow fade or erasure may be achieved by utilizing a high resistivity dielectric, such as the zinc sulfide described herein, which is photoconductive. In this instance the erasing operation and rate are controlled by the intensity of the light directed onto the storage target which permits the stored charges thereon to "leak" to the mesh conductors.

In FIGURE 2, another embodiment is shown wherein the novel storage target of the invention is provided in what may be called a single-ended or single gun scan converter tube. In the tube shown, it will be appreciated that separate electron guns for reading and writing have been eliminated with the result that essentially only half of the double-ended, two-gun tube of FIGURE 1 is shown. In this embodiment, the electron gun 4 performs both the writing and reading functions on a time-sharing basis. Such a tube is less expensive to manufacture and its lower cost may be an important advantage in applications where there is no necessity for simultaneous writing and reading. In the embodiment of FIGURE 2, the novel target structure 16 of the invention is disposed either near or on the glass face plate end 28 of the tube 2 with the dielectric layer portion 20 facing the face plate 28. It is feasible, however, to reverse the target structure 16 so that dielectric layer portion 20 faces the electron gun 4. The diffused gold portions 22 of the dielectric layer 20 is useful in this embodiment notwithstanding the fact that only one electron gun is utilized since the diffused gold portions 22 assure that no electrical charges can be built at these portions.

There thus has been described a novel and useful storage target for electron tubes, particularly of the scan converter type. The advantageous features of the invention have been pointed out and it is believed that the invention is a significant advance in the art to which it pertains.

What is claimed is:

1. An electronic tube for storing electrical input signals and providing electrical output signals corresponding thereto comprising:
   (A) an evacuated envelope;
   (B) a storage target disposed in said envelope and including:
     (1) a metallic mesh electrode member;

(2) a layer of dielectric material disposed on one side of said mesh electrode member and having electrically conductive regions extending through said layer from one side thereof to the other and in contact with the metallic portions of said mesh electrode member on said one side thereof;

(C) an electron gun disposed in said envelope for forming an electron beam and adapted to cause said electron beam to scan one side of said storage target;

(D) a second electron gun disposed in said envelope for forming a second electron beam and adapted to cause said second electron beam to scan the other side of said storage target;

(E) and means disposed in said envelope for collecting secondary electrons emitted from said dielectric layer in response to the impingement thereof by one of said electron beams.

2. An electronic tube for storing electrical input signals and providing electrical output signals corresponding thereto comprising:

(A) an evacuated envelope;

(B) a storage target disposed in said envelope and including:
   (1) a metallic mesh electrode member;
   (2) a layer of dielectric material disposed on one side of said mesh electrode member and extending over the metallic portions thereof as well as over the openings therein;
   (3) said layer of dielectric material having electrically conductive regions in contact with and co-terminous with said metallic portions of said mesh electrode member formed by the diffusion of an electrically conductive material from said metallic portions into said regions, said regions extending through said layer of dielectric material from one side thereof to the other;

(C) an electron gun disposed in said envelope for forming an electron beam and adapted to cause said electron beam to scan one side of said storage target;

(D) a second electron gun disposed in said envelope for forming a second electron beam and adapted to cause said second electron beam to scan the other side of said storage target;

(E) and means disposed in said envelope for collecting secondary electrons emitted from said dielectric layer in response to the impingement thereof by one of said electron beams.

3. An electronic tube for storing electrical input signals and providing electrical output signals corresponding thereto comprising:

(A) an evacuated envelope;

(B) a storage target disposed in said envelope and including:
   (1) a metallic mesh electrode member;
   (2) a layer of diffusable metal deposited on one side of the metallic portions of said mesh electrode member;
   (3) a layer of dielectric material disposed on said layer of diffusable metal and extending over the openings in said mesh electrode member;
   (4) said layer of dielectric material having electrically conductive regions adjacent to and in electrically conductive relationship with said metallic portions of said mesh electrode member and formed by the diffusion of some of said diffusable metal into said layer of dielectric material, said regions extending through said layer of dielectric material from one side thereof to the other;

(C) an electron gun disposed in said envelope for forming an electron beam and adapted to cause said electron beam to scan one side of said storage target;

(D) a second electron gun disposed in said envelope for forming a second electron beam and adapted to cause said second electron beam to scan the other side of said storage target;

(E) and means disposed in said envelope for collecting secondary electrons emitted from said dielectric layer in response to the impingement thereof by one of said electron beams.

4. An electronic tube for storing electrical input signals and providing electrical output signals corresponding thereto comprising:

(A) an evacuated envelope having a pair of electron guns disposed therein;

(B) a storage target disposed in said envelope and between said pair of electron guns including:
   (1) a metallic mesh electrode member;
   (2) a layer of dielectric material disposed on one side of said mesh electrode member and extending over the metallic portions thereof as well as over the openings therein;
   (3) said layer of dielectric material having electrically conductive regions in contact with and co-terminous with said metallic portions of said mesh electrode member formed by the diffusion of an electrically conductive material from said metallic portions into said regions, said regions extending through said layer of dielectric material from one side thereof to the other;

(C) and means disposed in said envelope for collecting secondary electrons emitted from said dielectric layer in response to the impingement thereof by an electron beam formed by one of said electron guns.

5. An electronic tube for storing electrical input signals and providing electrical output signals corresponding thereto comprising:

(A) an evacuated envelope having a pair of electron guns disposed therein;

(B) means for modulating one of said electron guns in accordance with said input signals;

(C) a storage target disposed in said envelope and between said pair of electron guns including:
   (1) a metallic mesh electrode member;
   (2) a layer of dielectric material disposed on one side of said mesh electrode member and extending over the metallic portions thereof as well as over the openings therein;
   (3) said layer of dielectric material having electrically conductive regions in contact with and co-terminous with said metallic portions of said mesh electrode member formed by the diffusion of an electrically conductive material from said metallic portions into said regions, said regions extending through said layer of dielectric material from one side thereof to the other;

(D) and means disposed in said envelope for collecting secondary electrons emitted from said dielectric layer and deriving therefrom output signals in response to the impingement thereof by an electron beam formed by the other of said electron guns.

6. In an information storage device comprising a storage member, a first electron beam producing means for charging areas of said storage member, and a second electron beam producing means for reading the information stored on said areas, the improvement in said storage member comprising: a layer of dielectric material disposed on one side of a mesh electrode member and extending across the openings therein and having electrically conductive regions extending through said layer of dielectric material from one side thereof to the other and substantially co-terminous with the metallic portions of said mesh electrode member and in electrically conductive relationship therewith.

7. The invention according to claim 6 wherein said electrically conductive regions include an electrically conductive material diffused into said regions from said metallic portions of said mesh electrode member.

8. An electronic tube for storing electrical input signals and providing electrical output signals corresponding thereto comprising:
  (A) an evacuated envelope;
  (B) a storage target disposed in said envelope and including:
    (1) a metallic mesh electrode member;
    (2) a layer of dielectric material disposed on one side of said mesh electrode member and having electrically conductive regions extending through said layer from one side thereof to the other and in contact with the metallic portions of said mesh electrode member on said one side thereof;
  (C) an electron gun disposed in said envelope for forming an electron beam and adapted to cause said electron beam to scan one side of said storage target;
  (D) and means disposed in said envelope for collecting secondary electrons emitted from said dielectric layer in response to the impingement thereof by said electron beam.

9. A storage target for electron tubes comprising: a mesh electrode member, a layer of dielectric material disposed on one side of said mesh electrode member and extending across the openings therein, and electrically conductive regions extending through said layer of dielectric material from one side thereof to the other and substantially co-terminous with the mesh portions of said electrode member and in electrically conductive relationship therewith.

10. The invention according to claim 9 wherein said electrically conductive regions include an electrically conductive material diffused into said regions from said metallic portions of said mesh electrode member.

References Cited

UNITED STATES PATENTS

| 2,687,492 | 8/1954 | Szegho et al. | 313—68 X |
| 2,833,958 | 5/1958 | Pensak | 313—68 X |
| 3,038,095 | 6/1962 | Schneeberger | 313—71 |
| 3,356,878 | 12/1967 | Yaggy et al. | 313—68 |

JAMES W. LAWRENCE, Primary Examiner

V. LAFRANCHI, Assistant Examiner

U.S. Cl. X.R.

313—70, 89; 315—13